(12) United States Patent
Cirlig (10) Patent No.: US 10,512,848 B2
(45) Date of Patent: Dec. 24, 2019

(54) SYSTEM AND METHOD FOR COMPUTER IMPLEMENTED GAME

(71) Applicant: KING.COM LIMITED, St. Julians (MT)

(72) Inventor: Gabriel Constantin Cirlig, Bucharest (RO)

(73) Assignee: KING.COM LTD., St. Julians (MT)

( * ) Notice: Subject to any disclaimer, the term of this patent is extended or adjusted under 35 U.S.C. 154(b) by 1582 days.

(21) Appl. No.: 14/288,814

(22) Filed: May 28, 2014

(65) Prior Publication Data

US 2015/0343305 A1    Dec. 3, 2015

(51) Int. Cl.
*A63F 13/80* (2014.01)
*A63F 13/35* (2014.01)

(52) U.S. Cl.
CPC .............. *A63F 13/80* (2014.09); *A63F 13/35* (2014.09)

(58) Field of Classification Search
CPC ...................................................... A63F 13/80
See application file for complete search history.

(56) References Cited

U.S. PATENT DOCUMENTS

| | | | | |
|---|---|---|---|---|
| 2003/0040350 A1* | 2/2003 | Nakata | ...................... | A63F 9/10 463/9 |
| 2003/0195044 A1* | 10/2003 | Narita | ...................... | A63F 13/10 463/43 |
| 2004/0072611 A1* | 4/2004 | Wolf | ...................... | G07F 17/32 463/20 |
| 2005/0056999 A1* | 3/2005 | Roemer | ................... | G07F 17/32 273/273 |
| 2006/0252478 A1* | 11/2006 | Eto | ........................ | A63F 13/10 463/9 |
| 2007/0218966 A1* | 9/2007 | Tilston | ................... | A63F 13/10 463/5 |
| 2007/0265053 A1* | 11/2007 | Linard | ...................... | A63F 9/18 463/16 |
| 2007/0298866 A1* | 12/2007 | Gaudiano | ............... | A63F 13/00 463/23 |
| 2009/0197677 A1* | 8/2009 | Takeda | ................... | A63F 13/10 463/31 |
| 2010/0273554 A1* | 10/2010 | Leftwich | ............... | A63F 13/426 463/31 |
| 2013/0331162 A1* | 12/2013 | Krivicich | ............ | G06F 3/04812 463/10 |
| 2014/0155160 A1* | 6/2014 | Lai | ........................ | A63F 13/69 463/31 |

(Continued)

OTHER PUBLICATIONS

International Search Report, dated Sep. 2, 2015, and Written Opinion issued in International Application No. PCT/EP2015/061912.

(Continued)

*Primary Examiner* — Tramar Y Harper
(74) *Attorney, Agent, or Firm* — Saul Ewing Arnstein & Lehr LLP (57) ABSTRACT

A system for providing a computer implemented game with a plurality of game elements which in use are displayed on display. The system comprises: a game engine; and for each game element a game element actor and game element data, said game element data comprising information about said respective game element and said game element actor being configured to perform a view function for the respective game element.

16 Claims, 7 Drawing Sheets

(56) References Cited

U.S. PATENT DOCUMENTS

| | | | | |
|---|---|---|---|---|
| 2014/0235306 A1* | 8/2014 | Walls | A63F 13/10 463/9 |
| 2014/0274418 A1* | 9/2014 | Knutsson | A63F 9/24 463/43 |
| 2014/0302935 A1* | 10/2014 | Royce | A63F 13/822 463/42 |
| 2014/0342791 A1* | 11/2014 | Hugh | A63F 13/80 463/9 |
| 2015/0328538 A1* | 11/2015 | Oyama | A63F 13/80 463/9 |
| 2015/0379808 A1* | 12/2015 | Rosenblatt | G07F 17/34 463/20 |
| 2016/0023112 A1* | 1/2016 | Oniscu | A63F 13/52 463/31 |

OTHER PUBLICATIONS

Laramee, Game Programming Gems 2, pp. 51-61 (Jul. 26, 2001) XP55208089.
Hamaide, Game Programming Gems 7, pp. 87-96 (Feb. 8, 2008) XP55208094.

* cited by examiner

SYSTEM AND METHOD FOR COMPUTER IMPLEMENTED GAME

FIELD OF THE INVENTION

Some embodiments may relate to algorithms for controlling a user interface responsive to user engagement with an interface of a computer device. The embodiments may have particular, but not exclusive application in the field of computer implemented applications including for example games, in an online or offline environment, and computing devices therefor.

BACKGROUND OF THE INVENTION

Computer implemented games are a well-known category of games that allow a player to interact with a computing device to cause the processor to perform certain functions and typically display a result on a screen or other display device.

Different types of games have evolved from classical arcade games in to games that can be played on a handheld device such as a smartphone or personal computer. Some games are also connected to the Internet and the player can play against or compare score with other users in multiplayer mode.

A common genre of casual games is so-called match games. This is a type of tile-matching game where the player manipulates tiles or game objects according to a matching criterion. In many tile-matching games, that criterion is to place a given number of tiles of the same type so that they adjoin each other. The criterion for matching is often to place the tiles so that a number of tiles of the same colour or of the same shape or any other characteristic are aligned or adjoined.

SUMMARY OF THE INVENTION

According to a first aspect there is provided a system for providing a computer implemented game having a plurality of game elements which in use are displayed on display, said system comprising: a game engine; and for each game element a game element actor and game element data, said game element data comprising information about said respective game element and said game element actor being configured to perform a view function for the respective game element.

The game element data may comprise at least one of position information and attribute information.

The system may comprise an attribute data store configured to be accessed by said respective game element actors, said game element actors configured to preform said view function in dependence on data in said attribute data store.

The data of said attribute data store may comprise value objects.

The system may comprise a game updater comprising at least one tool and configured to update game element data.

The game updater may comprise a plurality of tools and said game engine is configured to control when a tool is performed.

The at least one tool may be configured to perform at least one game mechanic.

The system may comprise an input configured to receive a user input, said user input being received by said game engine.

The system may comprise a game root, said game root configured to cause said game element to be displayed, said game root using the game element view provided by said game element actor.

At least one of said game engine and said game element actor may comprise a software module.

According to a second aspect there is provided a method for use in a computer implemented game comprising the steps of: receiving user input at a game engine; providing instruction selection information from said game engine to said game updater in dependence on said received user input; providing update instructions to said game updater from said game engine; updating with said game updater game element data associated with a plurality of game elements; instructing a respective plurality of actors associated with said plurality of game elements to access game element view information associated with said respective game elements; and providing game view information from said plurality of actors to a game root in dependence on said accessed game element view information.

The game root may use said provided view information to provide information to a display.

Accessing game element view information may comprise: accessing respective game element information associated with said game element; and using said game element information locate said game element view information.

According to a third aspect there is provided a method for use in a computer implemented game said computer implemented game comprising a plurality of game elements the method comprising: receiving an instruction from a game engine to retrieve game element data, said game element data comprising information about a respective game element of said computer implanted game; and providing view information associated with said respective game element to a game root.

The game element data may comprise at least one of position information and attribute information.

The method may comprise using said game element data to obtain respective game element view information stored an attribute data store to generate said view information for said respective game element.

The attribute data store may be configured to be accessed by a plurality of game element actors wherein each game element actor is associated with a game element.

According to a fourth aspect there is provided a method for use in a computer implemented game comprising: receiving information dependent on user input and selection information from a game engine; performing at least one instruction on at least one game element dependent on said selection information; receiving at least one further instruction from said game engine; and in response to said at least one further instruction updating data of one or more game elements.

The performed instruction may be one of a plurality of pre-stored instructions at a game updater.

According to a fifth aspect there is provided a method for use in a computer implemented game comprising: receiving user input; providing information dependent on the received user input to a game updater; instructing said game updater to perform at least one action; instructing said game updater to update game element data associated with a plurality of game elements; and instructing a plurality of actors to access said game element data and access game element view information in dependence on said game element data wherein each actor is associated with one of said plurality of game elements.

The game element data may comprise at least one of position information and attribute information.

The game element view information may be stored in an attribute data store.

DETAILED DESCRIPTION OF THE INVENTION

In the following description of various implementations of the invention, reference is made to the accompanying drawings which form a part thereof, and in which is shown by way of illustration various implementations in which the invention may be utilized. It is to be understood that other implementations may be utilized, and structural and functional modifications may be made without departing from the scope of the present invention.

The terms user and player are used interchangeably throughout this document and no specific meaning is intended using one or the other unless the context suggests otherwise.

A person skilled in the art will realise that the different approaches to implementing the game is not exhaustive, what is described herein are certain preferred embodiments. It is possible to implement the way in a number of variations without departing from the spirit or scope of the invention.

Figure 1:
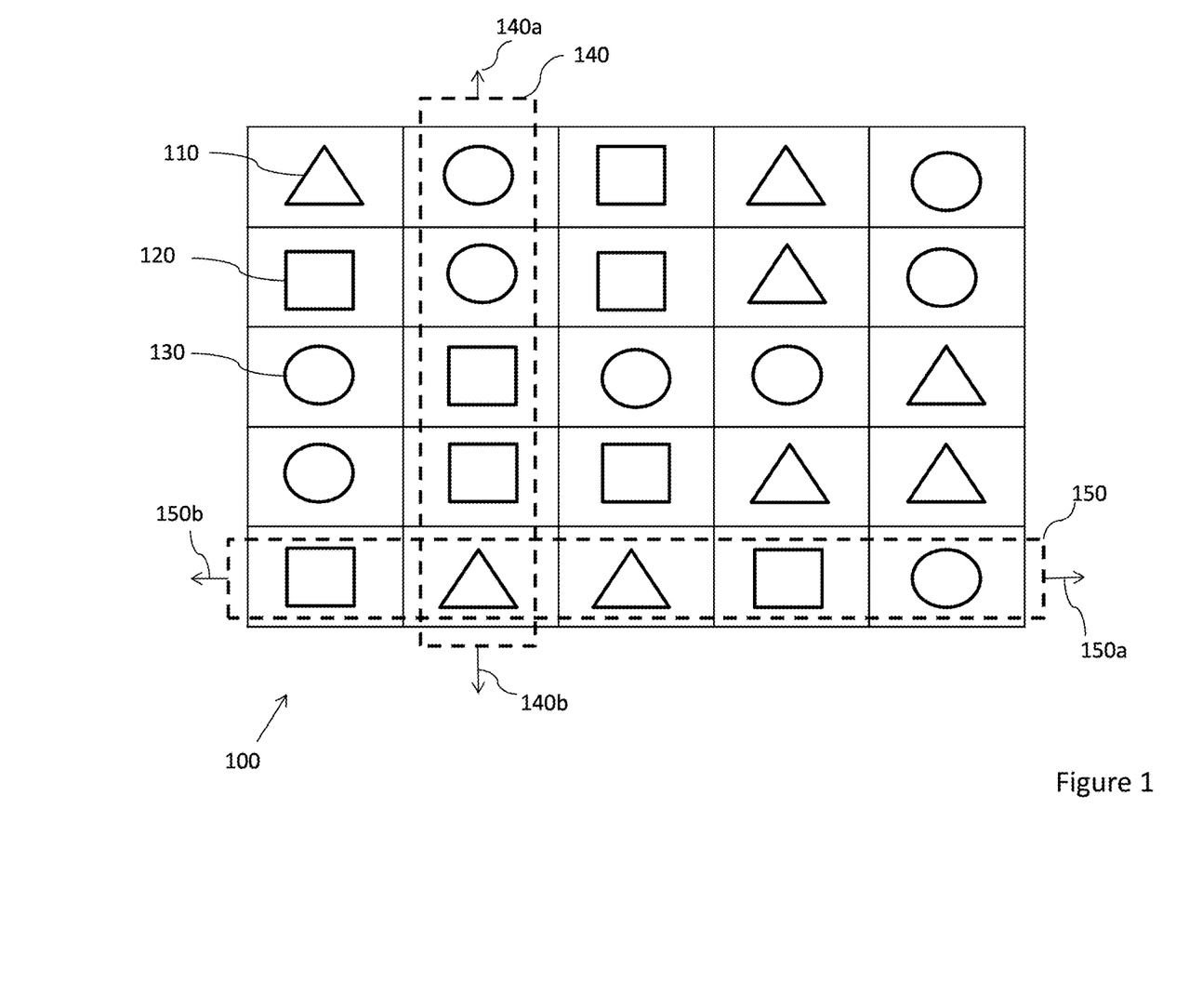
FIG. 1 shows an example embodiment of a game area or board.
Figure 4A:
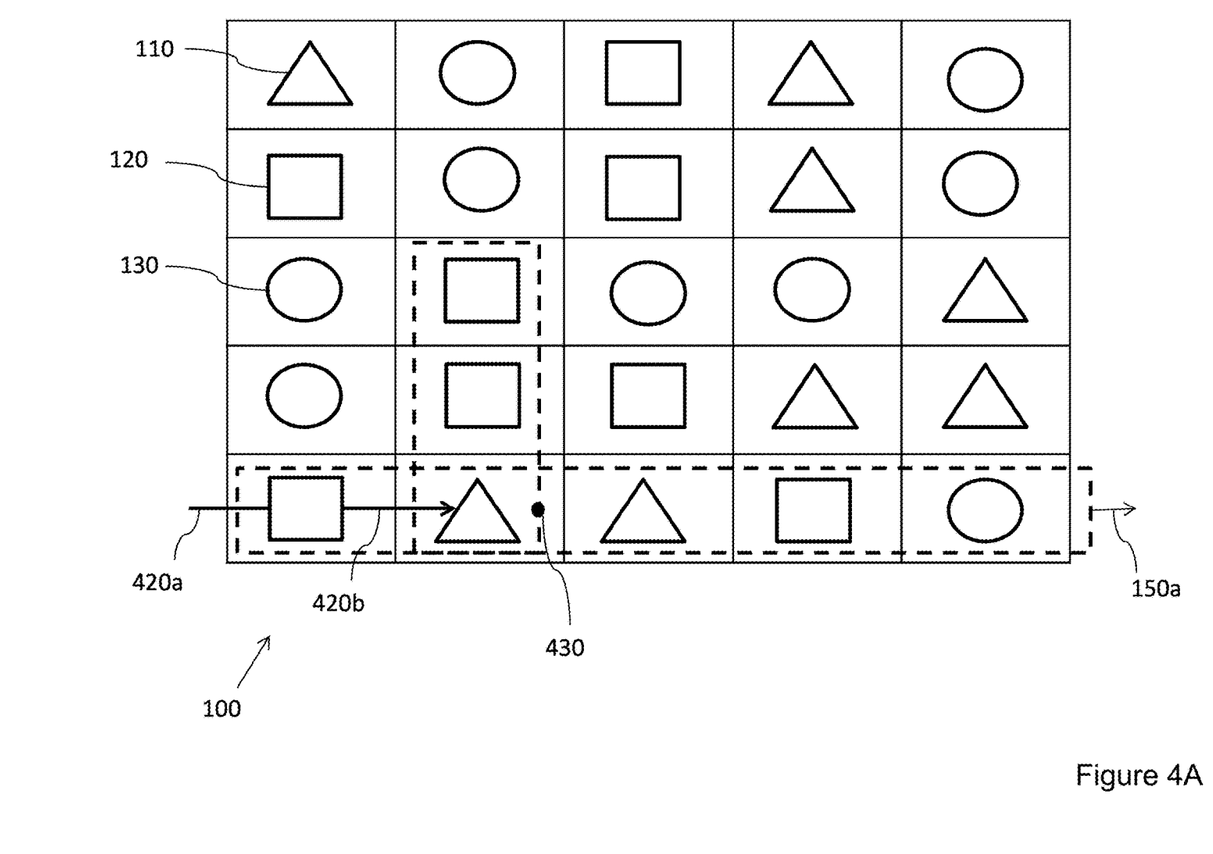
FIGS. 4A, 4B and 4C illustrate example selection mechanics according to some embodiments.
Figure 4B:
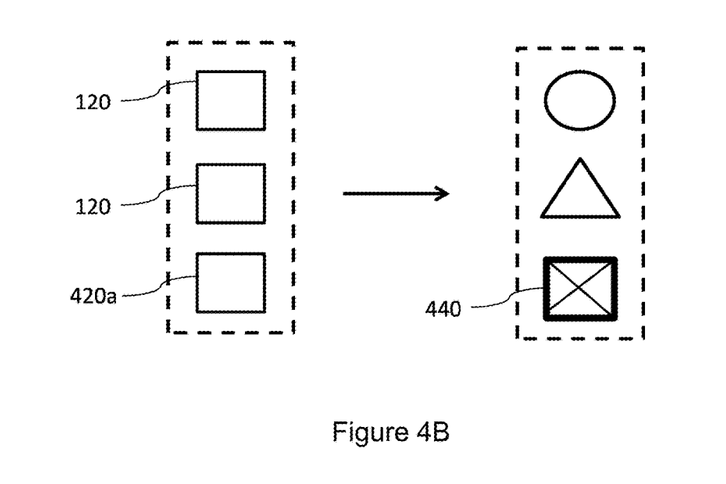
Figure 4C:
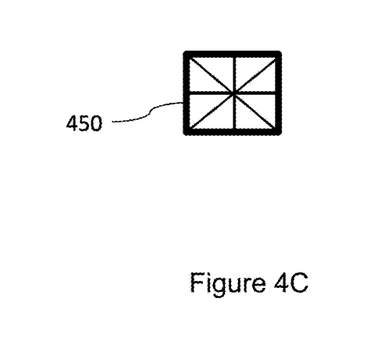
Figure 5:
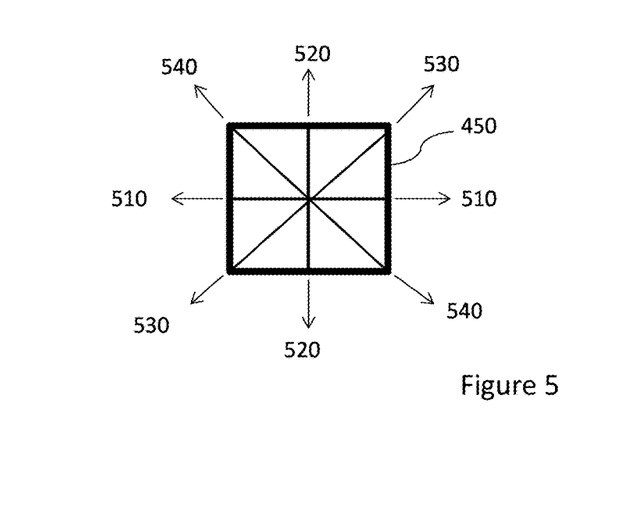
FIG. 5 illustrates an example object and action characteristics according to some embodiments.

FIGS. 1, 4 and 5 show examples of a computer implemented game according one embodiment of the present invention. It should be understood that the present invention is not limited to this example and may include other computer implemented games.

FIG. 1 shows an example schematic arrangement 100 for display on a user device according to an embodiment. An algorithm is configured to control the device such that an arrangement such as shown in FIG. 1 is displayed. The arrangement comprises a displayed game area 100 having first objects (also referred to as tiles or game elements) 110, 120, 130. Each tile has one or more attributes. Each attribute may have one or more possible values. These objects are game elements or tiles. The attributes may comprise colour, shape, and/or different types of objects with associated value. The first objects may have other characteristics defining graphical representations and shapes, and may represent different types of similar objects when displayed on the game area 100.

First objects 110, 120, 130 may be removed from the game board 100 by user input sliding a row or column of first game objects 120 to create a sequence. The sequence may require three or more first game objects of having at least one attribute having the same value to be aligned adjacent one another in a row or column of said game area 100.

The game may, in one embodiment, end if the player or user runs out of time or moves before managing to reach a designated target such as a score or moves (not shown in FIG. 1).

Those skilled in the art will appreciate that the arrangement of other grid sizes or patterns may be suitable.

The first objects 110, 120, 130 displayed on the arrangement 100 may have four (or any other suitable number of) contact points with other neighbouring or adjacent first objects.

Other game board layouts or configurations may be provided. For example, pyramidal, hexagonal, octagonal or other layouts comprising position spaces or tiles within the game board 100 may be provided for display.

Figure 2:
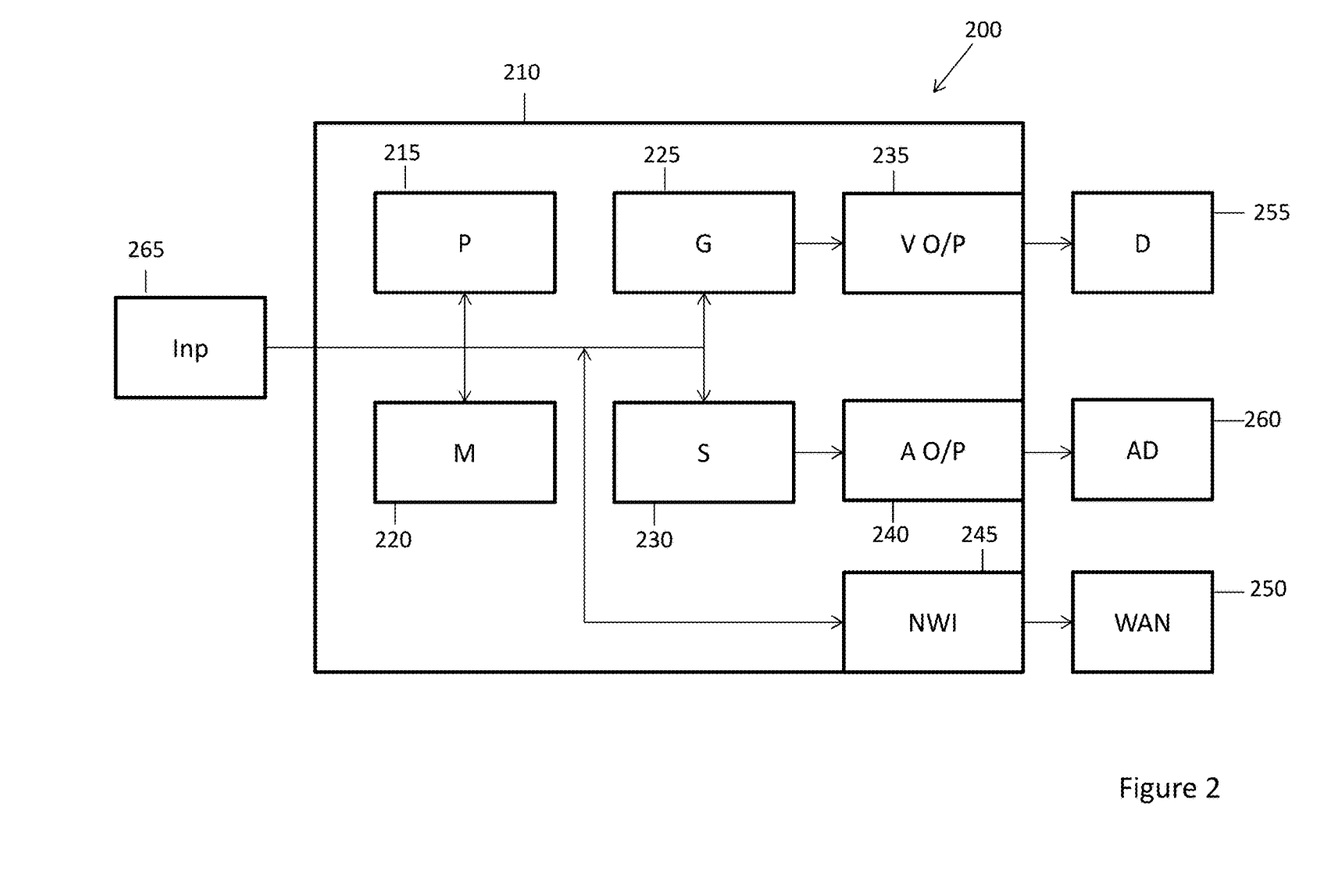
FIG. 2 shows an example user device in which some embodiments may be provided.

The number of differing colours may for example be three or more colours. A schematic view of a user or computing device 200 according to an embodiment is shown in FIG. 2. All of the blocks shown are implemented by suitable circuitry and/or may be software modules. The blocks may be implemented in hardware and/or software. The user device may have a control part 210. The control part 210 has one or more processors 215 and one or more memories 220. The control part 210 is also shown as having a graphics controller 225 and a sound controller 230. It should be appreciated that one or other or both of the graphics controller 225 and sound controller 230 may be provided by the one or more processors 215.

The graphics controller 225 is configured to provide a video output 235. The sound controller 230 is configured to provide an audio output 240. The controller 210 has an interface 245 allowing the device to be able to communicate with a network 250 such as the Internet or other communication infrastructure.

The video output 235 is provided to a display 255. The audio output 240 is provided to an audio device 260 such as a speaker and/or earphone(s).

The device 200 has an input device 265. The input device 265 can take any suitable format and can be one or more of a keyboard, mouse, touch screen, joystick or game controller. It should be appreciated that the display 255 may in some embodiments also provide the input device 265 by way of an integrated touch screen for example.

The blocks of the controller 210 are configured to communicate with each other by an interconnect such as a bus or any other suitable interconnect and/or by point to point communication.

It should be appreciated that in some embodiments, the controller 210 may be implemented by one or more integrated circuits, at least in part.

The user device 200 is shown by way of example only. In alternative embodiments, one or more of the parts may be omitted. Alternatively or additionally, some embodiments may comprise one or more other parts. Alternatively or additionally, one or more parts may be combined.

Figure 3:
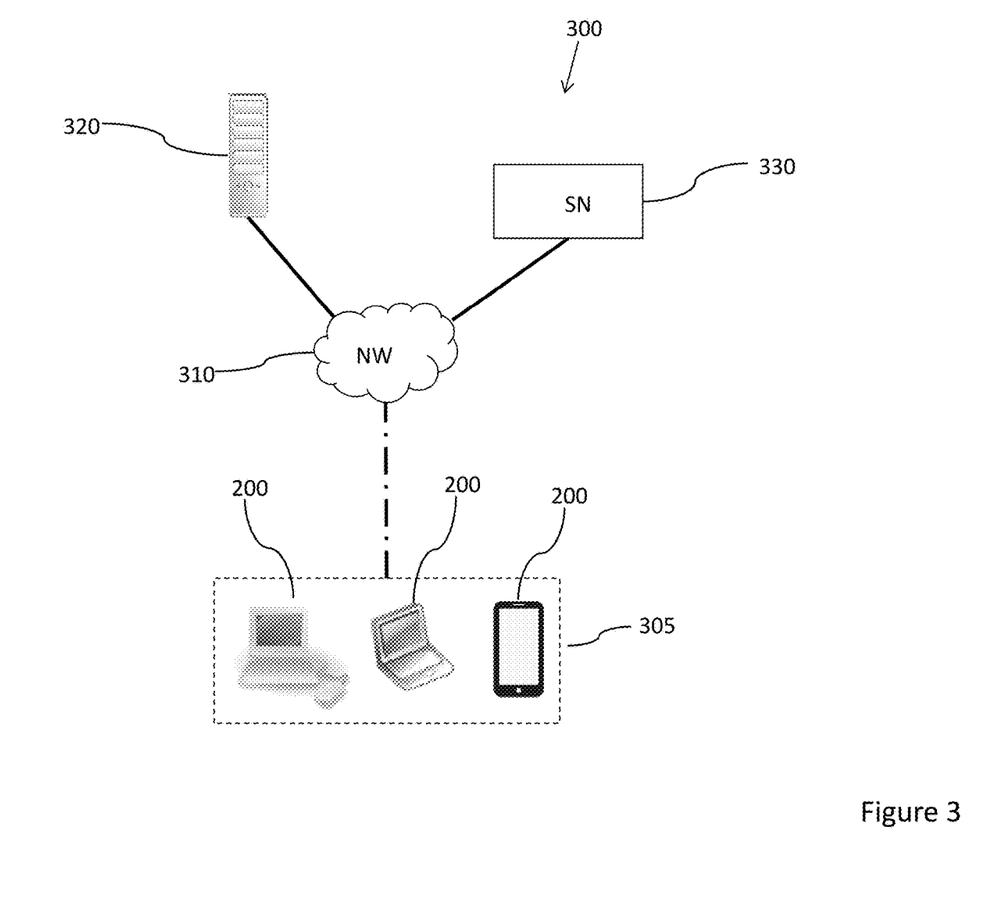
FIG. 3 shows an example system in which some embodiments may be provided.

FIG. 3 schematically shows a system 300 in some embodiments. The system 300 comprises a server 320 which may store databases of game players' details, profiles, high scores and so on. In practice, one or more databases may be provided. Where more than one server is provided, the database(s) may be provided in one database or across two or more servers 320. The server 320 may also have a games data function. This may comprise a memory to store the computer game program and a processor to run the games program.

The server may communicate via for instance the internet 310 to one or more user devices 305 and may further provide connections to a social network 330 such as Facebook™.

It should be appreciated that embodiments may be deployed in different system architectures. For example, the computer game may be implemented as a computer game that is stored in the memory 220 of the user device 200 and is run on the processor 215 of the user device 200. However, the server 320 may handle some elements of the game in some embodiments. By way of example only, a Java game applet may be provided to the user device 200 and the locally running Java applet will generate, for example, the graphics, sounds, and user interaction for the game play on the user device 200. Some data may be fed back to the server 320 to allow interaction with other players 305. The data which is fed back may also allow scoring and/or cross platform synchronization.

In some embodiments, the game may be implemented as a computer program that is stored in a memory of the system, for example the server 320, and which runs on a processor of the game server. Data streams or updates are supplied to the user device 200 to allow the user device 200 to render and display graphics and sounds in a browser of the user device 200. Such an approach is sometimes referred to as a web services approach. It should be appreciated, however, that such an approach does not necessarily require the use of the Internet.

It should be appreciated that some embodiments may be provided as stand-alone games on the user device.

The device and systems of FIGS. 2 and 3 may execute various algorithms as will be described.

FIG. 4A shows the game area and arrangement of FIG. 1. Input via the user input is detected at a position corresponding to object 420a to select the object 420a. The selection of the object may be by the user moving a cursor using a pointer device such as a mouse, a touch pad or the like. Alternatively the selection of the object may be detected by detecting a user's finger or the like at a location of a touchscreen at the position of the displayed object.

A subsequent slide input is detected indicating that the user wishes to slide the row in which object 420a is located in the direction of arrow 420b as shown. In doing so, a rearrangement algorithm may be invoked by processor 215 if the movement creates a matching sequence of three or more first objects as shown by region 430 and the end of input is detected.

FIG. 4B illustrates the region 430 creating a match since at least three objects 120 and 420a sharing at least one same characteristic are aligned adjacent each other after the input.

A match may comprise three or more objects sharing at least one same characteristic being repositioned to be adjacent each other in a column if the input movement is in a horizontal direction with respect to the arrangement 100 or the three or more objects may be adjacent each other in a row if the input movement is in a vertical direction with respect to the arrangement 100.

Such a detected match causes the processor 215 to execute a rearrangement and update object algorithm. This is shown pictorially on the right side of FIG. 4b wherein objects 120 of selected match area 430 have been replaced by objects 130, 110. In particular object 420a has been upgraded to object 440 having at least one different characteristic to the previously matched first object characteristics, whilst still sharing at least one same characteristic.

FIG. 4B indicates this by way of example by depicting object 440 as a larger square shaped object 440 with an indication (here simply shown as crosshatching) that the object has been upgraded from a first level to second.

FIG. 4C indicates a further level upgrade following a subsequent match of three adjacent objects including object 440, wherein already updated object 440 been replaced by a further upgraded object 450 as indicated in the figure.

FIG. 5 illustrates pictorially object 450 after upgrade with an indication of at least one associated action characteristic 510, 520, 530, 540. For example, selection of the further upgraded object 450 in a subsequent match may activate one or more of the action characteristics of the object 450 to remove and replace all objects along a row 510, column 520 or those occupying positions that are in diagonal 530, 540 from the position of the activated object 450.

In some embodiments, the number of different upgrade levels available may be two or more. In some games, the number of upgrade levels may be three. When the object has been upgraded the maximum number of times, the upgraded object, when in a match will provide an action which removes tiles in addition to the tiles being match. For example, the action may be line blasters or bomb type effects.

The action provided may be selected at random. In some embodiments, only one type of action is provided in a game. In some embodiments, the action provided may be associated with a value of an attribute of the object. The value of the attribute may the same attribute which is used when matching. The attribute may be colour or any other suitable attribute.

Other action characteristics may be provided in memory 220, and may be selected randomly to apply to an upgraded object.

Other action characteristics may comprise increasing the score or value associated with the object 440, 450, activating special or other objects within the game area 100, or acting as a localised bomb by destroying all adjacent objects surrounding the activated further upgraded object 450.

Figure 6:
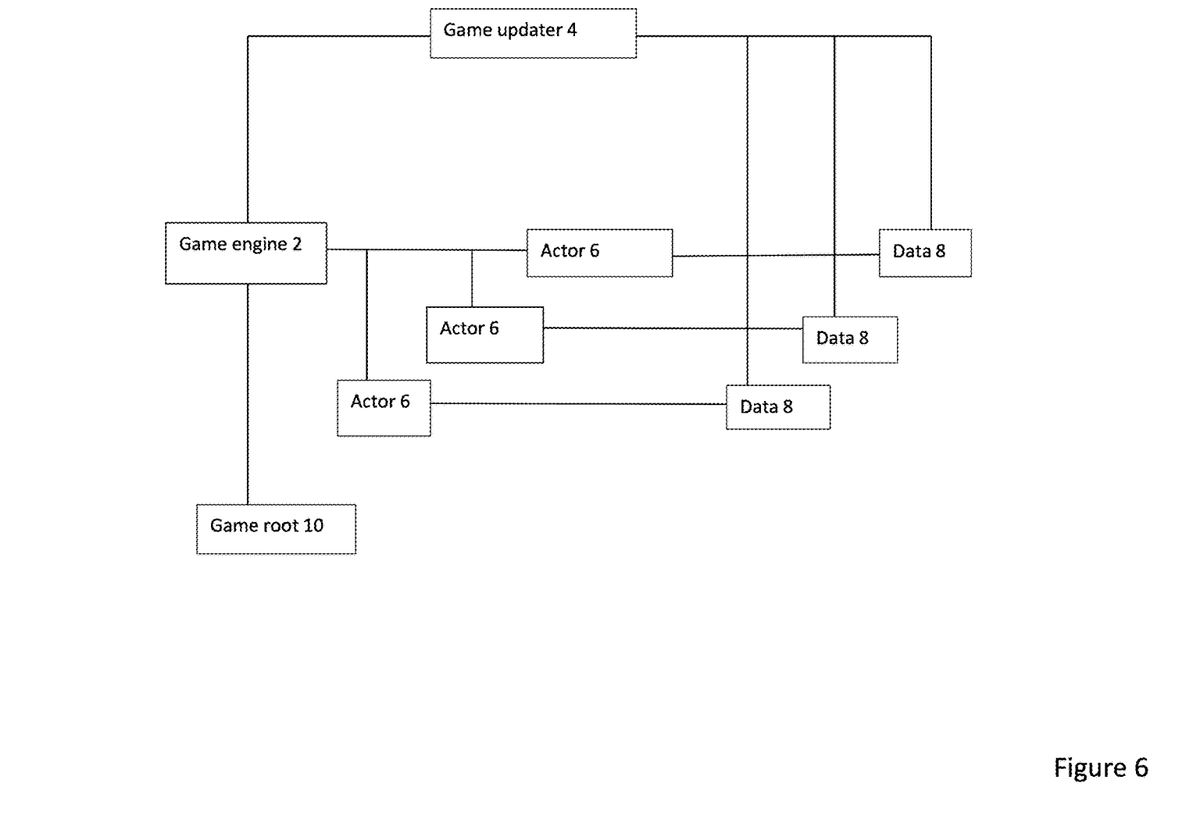
FIG. 6 shows a schematic illustration of an embodiment.

Reference is made to FIG. 6 which shows schematically shows an embodiment. The embodiment has a game engine 2, a game root 10, a game updater 4 and for each game element respective tile data 8 and an actor 6. Each of the game engine 2, game root 10, game updater 4 and actor 6 may be regarded as a software module. The game engine module 2 provides functions for a game some of which will be described below. However as will be described, a view function for drawing the game to display and function relating to changes in game data are removed from the game engine.

The data, which is provided in a respective memory location, contains the data from which the tile characteristics are defined. By way of example only, the data may identify the position of the tile and one or more attributes of the tile. One or more attributes may be provided. By way of example only, the attributes may be size, colour, character or the like of the tile. For example, the data comprises X (x coordinate information); Y (y coordinate information); a (where a is one of a set of numbers and each number represents a different colour); b (where b is one of a set of numbers and each number represents the size of the character). The attribute data is not itself stored in the tile data. It should be appreciated that the attributes mentioned are by way of example and any suitable attributes may be used in embodiments, dependent on the game.

The example above has numeric values to represent the type of a particular characteristic. For example the number 1 may mean the colour red. It should be appreciated that this is by way of example only and any other suitable method may be used to indicate the value or type of a particular attributed. In some embodiments, the data may have n bit where n represents each of the possible values of each of the possible attributes and 1 and 0 are used to indicate if the particular value of an attribute is present.

In some embodiments, a word or collection of letters may be used to indicate a value of the attributes such as RED, BLUE, GREEN for indicating a respective colour of the colour attribute. The attributes are stored in an attribute data class. The attribute data (value object or VO) is stored in a special class referred to as a model. When an actor is provided, a VO is assigned from the model by the game engine (which has access to both the actors and the model data). The value object is provided in dependence on the data. The model may be part of the engine in some embodiments. In other embodiments, the model may be provided outside the game engine 2.

The actor accesses the data through a reference to the attribute data object. In other words, the tile actor will have a reference to the data associated with the colour attribute a. Thus the actor 6 stores a reference to the attribute data. The actor 6 provides a view function. The actor 6, in providing the view function requests from the model the information that it needs to generate an output representation. The actor is prompted when to check the tile data to see if there is any change in any of the data by the game engine.

Input to the game from the user initially goes to the game engine (e.g. the user has moved a row of tiles). This information may be provided by the game engine to the game updater which will use the information to update the tile data.

The game updater 4 comprises a set of tools or instructions which are controlled by the game engine 2. The tools can take any suitable form. Examples of tools are: perform a vertical line blast where all tiles in a vertical line are removed; perform a horizontal line blast where all tiles in a horizontal line are removed; refill the game board with new tiles; check the tiles to see if a match has occurred; check the tiles to see if one or more tiles is associated with the performance of a particular function; update the tile data. The game engine controls the game updater to control which tool or instruction is performed at a particular time and where more than one tool is performed, the order.

It should be appreciated that the tools or instructions mentioned above are by way of example only and any other suitable tools or instructions may alternatively or additionally provided. The number of tools provided may be dependent on the game. One or more of the tools may implement a game mechanic. The tools or instructions provided may be dependent on the game.

The game updater 4 does the processing of a tool, for example, to decide if the tile data is to be updated. For example the game updater decides if the colour of a tile has changed (eg due to a change in tile position) or if a size of tile has changed (eg due to a match occurring). The game updater deals with all the changes in the attribute data. Everything else may be handled by the engine. The tile data will be updated by the game updater, in response to the respective tool of the game updater being selected by the game engine and that tool being carried out.

The game root 10 will cause the game to be displayed. The image of each tile is provided by the respective actor which provides the view function. The game engine 2 will provide control information to the game root such as a list of tiles which are to be displayed. For example, the game engine 2 may indicate which tiles are to be removed and which tiles are to be displayed.

The game engine 2 may only know about the list of actors. The game engine stores a reference to that list of actors in itself but does not manually update the list. The actors 6 provide the view function.

The game engine 2 will use the actor information to provide the data to the game root 2 to control the display of the device providing. The game engine is decoupled from the attribute data.

By having separate actor information for each tile, it may be easier to implement changes to the tile characteristics, when for example designing a game.

By using a separate game updater, a set of tools can be provided easily. A new tool can be easily added and/or a tool may be easily modified and/or a tool may be easily removed. Any one of the tools can be selected in any order by the game engine. This may make changing or designing a game easier and/or quicker.

It should be appreciated that in some embodiments, this game structure may mean fewer bugs or the like.

Figure 7:
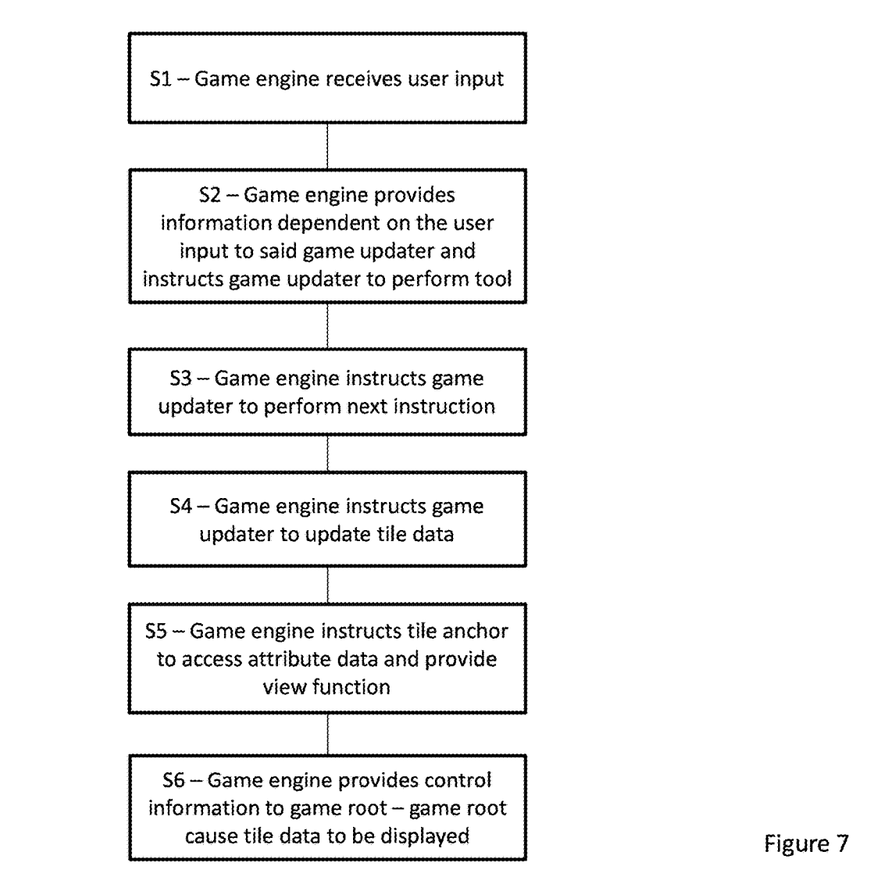
FIG. 7 shows a schematic flow of a method.

Reference is made to FIG. 7 which shows an example series of events for handling user input instructions in a match three game according to some embodiments.

In step S1 the game engine receives information input by a user. In one example, the information may come from a touchscreen. In another example, the information may come from a mouse or keyboard. The user input information may be information regarding a move made by the user. For example, the user input information may comprise the information related to two tiles to be switched.

In step S2 the game determines from the user input what information to provide to the game updater. For example, the game engine may detect that the user has selected to switch two game elements and instructs the game updater to check for a match of three adjacent tiles.

In step S3 the game engine instructs the game updater perform a next instruction. For example, this instruction may be to remove matching tiles. In some embodiments the game engine may provide further instructions to the game updater to perform further instructions. For example game engine may instruct the game updater to add new tiles to replace the removed tiles. The game engine may further instruct the game updater to check for a match of three adjacent tiles again since some tiles have now been replaced. This may be repeated until no new matches are made.

In step S4 the game engine instructs the game updater to update the tile data. The game updater then updates the tile data for any tile that has changed.

In step S5 the game engine instructs the actors to access attribute data and provide view functionality. Each actor may then access the tile data associated with that the respective and use that information to generate view functionality.

In step S6 the game engine provides control information to the game root. The game root causes tile data to be displayed. The tile data to be displayed may be the tile data accessed by the actors and provided as view functionality.

Various methods and devices have been described. It should be appreciated that these methods may be implemented in apparatus or devices comprising any suitable circuitry. Some embodiments may be implemented by at least one memory and at least one processor. The memory is provided by memory circuitry and the processor is provided by processor circuitry. Some embodiments may be provided by a computer program running on the at least one processor. The computer program may comprise computer implemented instructions which are stored in the at least one memory and which may be run on the at least one processor.

It is also noted herein that while the above describes embodiments of the invention, there are several variations and modifications which may be made to the disclosed solution without departing from the scope of the present invention.

The invention claimed is:

1. A system for providing a computer implemented game having a plurality of interactive game elements which in use are displayed on a display and manipulated in response to user input received via a user interface during gameplay, said system comprising, at least one processor and at least one memory configured to implement:
   a game engine configured to receive an input from a user, and to provide an output to at least one game element actor of a plurality of game element actors separate to said game engine;
   a game element data store configured to store game element data for each game element actor, said game element data comprising information about each of said interactive game elements;
   a game updater configured to update said game element data associated with said plurality of interactive game elements,
   wherein said game engine is configured to provide update instructions to said game updater in dependence on said received input from the user,
   wherein each of said plurality of game element actors is associated with a respective one of said plurality of interactive game elements, said game element actors configured to responsive to said output from said game engine, provide a view function for each respective interactive game element by accessing the respective game element data; and
   a game root, said game root configured to cause said interactive game elements to be displayed, said game root using the game element view functions provided by said game element actors.

2. A system as claimed in claim 1, wherein said game element data comprises at least one of position information and attribute information.

3. A system as claimed in claim 2, wherein at least one of said game engine and said game element actor comprises a software module.

4. A system as claimed in claim 1, comprising an attribute data store configured to be accessed by said respective game element actors, said game element actors configured to perform said view function in dependence on data in said attribute data store.

5. A system as claimed in claim 4, wherein the data of said attribute data store comprises value objects.

6. A system as claimed in claim 1, wherein the game updater comprises at least one instruction and is configured to update game element data.

7. A system as claimed in claim 6, wherein said game updater comprises a plurality of said instructions and said game engine is configured to control when one of said instructions is performed.

8. A system as claimed in claim 6, wherein said at least one instruction is configured to perform at least one game mechanic.

9. A computer implemented method for use in a computer implemented game, said computer implemented game comprising a plurality of interactive game elements, the method being performed by at least one processor in conjunction with at least one memory and comprising:
   causing the plurality of interactive game elements to be displayed on a display and manipulated in response to user input received via a user interface during gameplay;
   receiving user input at a game engine;
   providing an output from the game engine to at least one game element actor of a plurality of game element actors separate to the game engine, wherein each of said plurality of game element actors is associated with a respective one of said plurality of interactive game elements;
   receiving an instruction from the game engine at at least one of the game element actors to retrieve game element data from a game element data store provided by said at least one memory, said game element data comprising information about each of said game elements of said computer implemented game; and
   providing by each of said game element actors for a respective game element, view information associated with said respective game element to a game root;
   providing update instructions to a game updater from said game engine in dependence on said received user input;
   updating by said game updater, game element data associated with said plurality of interactive game elements; and
   causing, by a game root, said interactive game elements to be displayed using the game element view information provided by said game element actors.

10. A method of claim 9, wherein said game root uses said provided view information to provide information to a display.

11. A method of claim 9, comprising accessing game element view information by:
   accessing respective game element information associated with said game elements; and
   using said game element information to locate said game element view information.

12. A method as claimed in claim 9, wherein said game element data comprises at least one of position information and attribute information.

13. A method as claimed in claim 9, comprising using said game element data to obtain respective game element view information stored in an attribute data store to generate said view information for said respective game element.

14. A method as claimed in claim 13 wherein said attribute data store is configured to be accessed by a plurality of game element actors wherein each game element actor is associated with a game element.

15. The method of claim 9, further comprising the game updater:
   receiving selection information from a game engine;
   performing at least one instruction on the at least one game element dependent on said selection information;
   receiving at least one further instruction from said game engine; and
   in response to said at least one further instruction updating data of the one or more game elements.

16. A method as claimed in claim 15, wherein said performed instruction is one of a plurality of pre-stored instructions at a game updater.

* * * * *